United States Patent [19]
Sato

[11] Patent Number: 6,072,636
[45] Date of Patent: Jun. 6, 2000

[54] ANAMORPHIC ATTACHMENT LENS

[75] Inventor: Kenichi Sato, Ageo, Japan

[73] Assignee: Fuji Photo Optical Co., Ltd., Omiya, Japan

[21] Appl. No.: 09/384,999

[22] Filed: Aug. 30, 1999

[30]    Foreign Application Priority Data

Sep. 3, 1998  [JP]  Japan .............................. H10-249002

[51] Int. Cl.$^7$ .............................. G02B 13/08; G02B 3/00
[52] U.S. Cl. ............................................ 359/668; 359/642
[58] Field of Search .................................... 359/668–671, 359/672–675, 819, 642

[56]    References Cited

U.S. PATENT DOCUMENTS 5,339,193  8/1994  Korpert ................................... 359/819

FOREIGN PATENT DOCUMENTS 57-8514   1/1982   Japan .
7-333497  12/1995  Japan .

Primary Examiner—Georgia Epps
Assistant Examiner—Michael A Lucas
Attorney, Agent, or Firm—Arnold International; Bruce Y. Arnold

[57]    ABSTRACT

An anamorphic attachment lens is disclosed that consists of a single lens element which is afocal, so that light rays which are incident onto a photographic object side of said anamorphic attachment lens exit the photographic image side of said lens substantially parallel to the direction in which they were incident. The attachment lens enables a standing person to be photographed so as to appear either slimmer or fatter than normal, while employing only a single lens element which may be affixed to a camera. Since the attachment lens is afocal it does not affect the focusing of a camera with which it is used. Further, the attachment lens may be rotated 90 degrees about the optical axis in order to easily select whether the image will appear slimmer or fatter than normal. In preferred embodiments, prescribed conditions are satisfied to maintain high image quality and to insure that a predetermined amount of anamorphism is provided.

11 Claims, 4 Drawing Sheets

ANAMORPHIC ATTACHMENT LENS

BACKGROUND OF THE INVENTION

The use of various attachment lenses in conjunction with a still camera to achieve special effects has been conventionally known. However, due to the popularization of disposable or reusable cameras (i.e., lens-attached film) and the growing trend for portrait photo sticker machines, the taking of photos in recent years has been broadly penetrating onto the daily lives of general people. Additionally, photography is becoming not just the photographing of a photographic object as it actually is, but activities such as pen-writing on the photo and digitalizing the photo for further processing as well as other forms of enjoyment with photos are being commonly performed.

With this type of photographic development history, there is a growing demand to take photos and to perform special effects easily, even by persons unskilled in photography. An example of this type of special effect is photographing a heavy person so as to appear thin, or vice-versa.

As examples of prior art anamorphic attachment lenses which have the ability to achieve the special effect described above, the attachment lenses disclosed in Japanese Laid-Open Patent Application 57-8514 and Japanese Laid-Open Patent Application 7-333497 can be given. Both of these attachment lenses have the ability to form an image where the magnification in the vertical direction and the horizontal direction are mutually different with an angular magnification of 0.9 to 1.3, and each attachment lens includes two cylindrical lens elements. The lens material is assumed to be glass. The complexity and size of these attachment lenses have kept these lenses from widespread use by the general public.

BRIEF SUMMARY OF THE INVENTION

The present invention is to a single anamorphic attachment lens that is arranged on the photographic object side of the photographing lens of a still camera. The object of the present invention is to provide an anamorphic attachment lens having a simple and compact construction that enables the vertical and horizontal magnifications of a photographed object to be mutually different and does not affect the camera focus.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
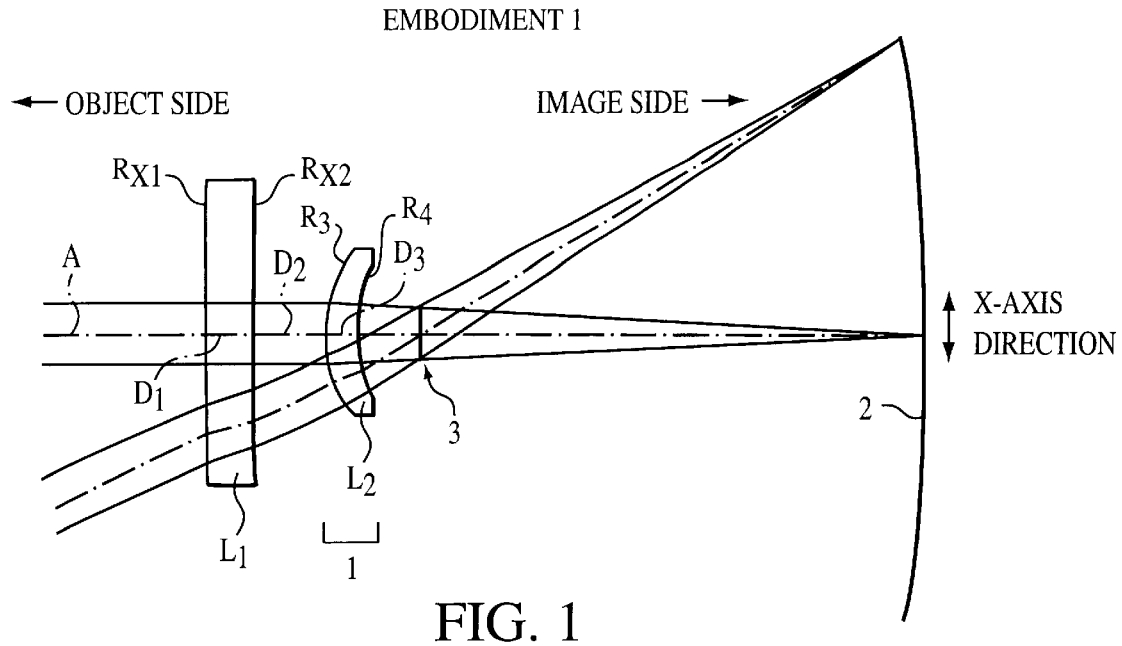
FIG. 1 shows the ray paths that occur in the plane defined by the optical axis A and the X-axis of the anamorphic attachment lens of Embodiment 1.

The anamorphic attachment lens of the present invention is a single lens element formed of two cylindrical-shaped surfaces. The radius of curvature of each cylindrical surface is different but the algebraic sign of the radii of curvature is the same (i.e., the center of curvature of each cylindrical surface is on the same side). In addition, the radii of curvature of the surfaces and the lens element thickness are such that a collimated light beam of a particular diameter that is incident on the anamorphic attachment lens exits the anamorphic attachment lens as a substantially collimated beam having a different beam diameter. Thus, the anamorphic attachment lens is afocal. This allows the anamorphic attachment lens of the invention to be attached to an imaging lens of a camera without affecting the position of the image plane. Thus, no refocusing of the camera is needed when the anamorphic attachment lens is applied to a camera or when the plane of anamorphism is rotated by rotating the anamorphic attachment lens relative to the camera.

When the anamorphic attachment lens is positioned with its convex surface toward the object being photographed, preferably, it is structured so as to satisfy each of the following conditions:

| | |
|---|---|
| $1.0 < Y\gamma < 1.1$ | Condition (1) |
| $0.05 < D/R_{Y1} < 0.50$ | Condition (2) | where $Y\gamma$ is the angular magnification in the direction that the anamorphic attachment lens has refractive power, D is the thickness of the attachment lens along the optical axis, and $R_{Y1}$ is the radius of curvature of the cylindrical-shaped surface of the attachment lens on the photographic object side.

On the other hand, when the anamorphic attachment lens is positioned with its concave surface toward the object being photographed, preferably, it is structured so as to satisfy each of the following conditions:

| | |
|---|---|
| $0.9 < X\gamma < 1.0$ | Condition (3) |
| $-0.2 < D/R_{X1} < -0.03$ | Condition (4) | where $X\gamma$ is the angular magnification in the direction that the anamorphic attachment lens has maximum refractive power (i.e., in the direction 90 degrees to the direction the anamorphic attachment lens has zero refractive power).

D is as defined above, $R_{X1}$ is the radius of curvature of the cylindrical-shaped surface on the photographic object side.

Condition (1) above regulates the range of angular magnification, and in the anamorphic attachment lens of Embodiment 1, it regulates the angular magnification that occurs in the Y-axis direction. The angular magnification that occurs in the Y-axis direction can be defined as the magnification that occurs in a plane 90 degrees to the X-axis direction, with the X-axis direction being the direction that the magnification does not change and is 1. That is to say, according to the Condition (1), it is possible to obtain an image that is enlarged by an enlarging ratio of up to 10% in the direction of the Y-axis. When exceeding the value of this upper limit, the power of each surface becomes too strong, thereby increasing the amount of aberration that is generated. Furthermore, when falling below the lower limit, the image in the Y-axis direction is reduced The reason the enlarging ratio here is limited to a 10% increase is because, based on experience, this enables photographing of objects, especially people, to be within a range that prevents unnatural photographic images.

Condition (2) regulates the numerical range of the cental thickness of the attachment lens in relation to the radius of curvature of the attachment lens. When exceeding the value of the upper limit, the attachment lens becomes too thick, thereby deteriorating its suitably for being manufactured. When falling below the value of the lower limit, the attachment lens becomes too thin. When the attachment lens becomes thinner, it becomes more difficult manufacture. For a constant amount of anamorphism, since the attachment lens of the present invention is afocal, it becomes necessary to increase the curvature of the lens surfaces when the lens is made thinner, and this makes the attachment lens more difficult to manufacture.

Condition (3) regulates the angular magnification that occurs in the X-axis direction. According to Condition (3) it is possible to obtain an image that is reduced by up to 10% in the X-axis direction He the Y-axis is unaffected Furthermore, when exceeding the upper limit of this condition, image in the X-axis direction is enlarged. The reason for the reduction ratio being only up to a 10% reduction is that, based on experience, this enables photographs of objects, especially of people, to be within a range that prevents obviously unnatural images.

Condition (4) regulates the numerical range for the central thickness of the lens element in relation to the surface of the lens element nearest the object. When falling below the lower limit value, the lens element becomes too thick, thereby making manufacturing of the lens element difficult and costly. Furthermore, when the upper limit value is exceeded, the lens element becomes too thin. When the lens is made thinner, it becomes difficult to perform precise processing of the lens element. Further, for a given amount of anamorphism and because the lens element is made to be afocal, the surface curvatures increase as the lens is made thinner. This too, makes the anamorphic lens element more difficult and expensive to manufacture.

Two embodiments of the present invention will now be described with reference to the figures.

Embodiment 1

Figure 2:
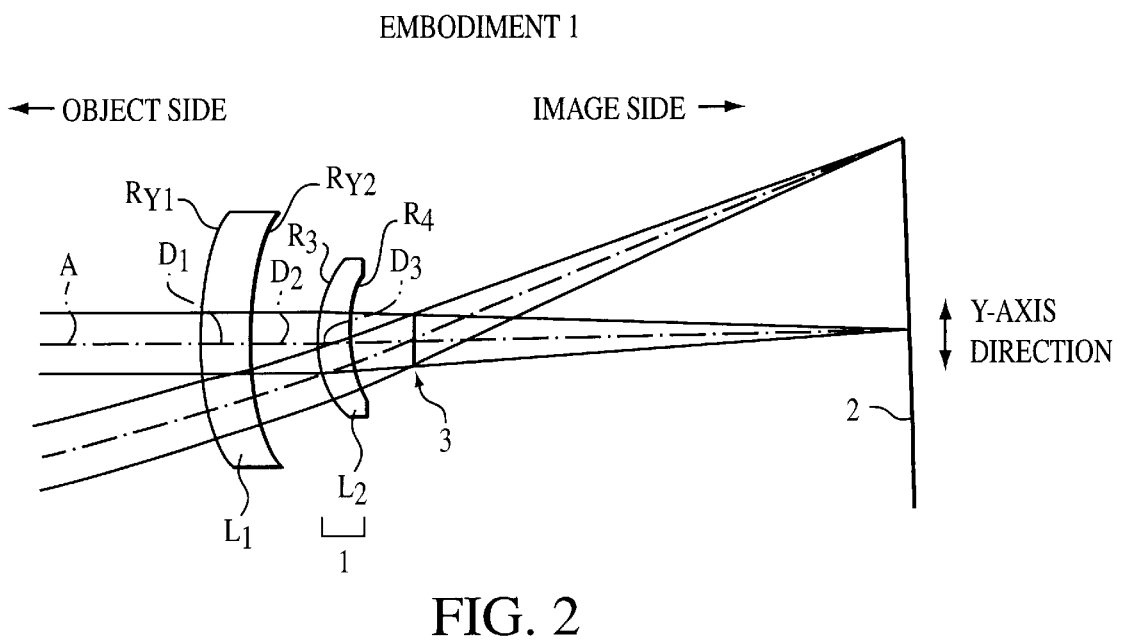
FIG. 2 shows the ray paths that occur in the plane defined by the optical as A and the Y-axis of the anamorphic attachment lens of Embodiment 1.

FIG. 1 and FIG. 2 show the lens element surfaces in the plane defined by the optical axis and the X-axis, and in the plane defined by the optical axis and the Y-axis, respectively, of the anamorphic attachment lens of Embodiment 1 of the present invention.

As is indicated in FIG. 2, the anamorphic attachment lens $L_1$ of Embodiment 1 is arranged on the photographic object side of a master component 1, and is formed of a convex, cylindrical surface in a plane defined by the optical axis A and the Y-axis. Thus, the convex, cylindrical surface has a positive refractive power in the Y-axis direction, and has no refractive power in the X-axis direction (as illustrated in FIG. 1). The other surface of the anamorphic attachment lens $L_1$ (i.e., the surface on the photographic image side) is formed of a concave, cylindrical surface in a plane defined by the optical axis A and the Y-axis.

Also shown in FIGS. 1 and 2 are components that may be used with the anamorphic attachment lens $L_1$. Master component 1 is an image-forming lens having a single master lens element $L_2$ which creates an image on image-formation surface 2, which corresponds to the surface of a photographic film illustrated at 3 is a diaphragm. The luminous flux which carries the photographic object information is formed into an image at image formation surface 2 after passing through an opening of the diaphragm 3. The image formation plane 2 is concave when viewed from the photographic object side and has an X-axis radius of curvature $R_x$ of −80 (in mm). In addition, since the attachment lens of the present invention is afocal in both the X-Axis direction (where it does not change the magnification) as well as in the Y-Axis direction, where it provides magnification, it is possible to attach the present invention to a camera without changing the positional relationship of the master component 1 and the image formation plane 2.

The anamorphic attachment lens of Embodiment 1 satisfies each of the above Conditions (1) and (2).

As described above, according to the range stipulated in Condition (1), it is possible to obtain an image that is enlarged by 6.45% in the Y-axis direction and is not enlarged or reduced in the X-axis direction. In other words,, when photographing a standing person with the film of the image forming plane forming a horizontal rectangle according to the general use of a camera, the photographic image will be enlarged by an enlarging ratio of 6.45% in only the vertical direction, thereby making the photographic image of the person appear slimmer than the actual person Moreover, there is also a method of reducing in the X-axis direction to obtain nearly the same effect as discussed immediately above. However, for reasons that will be described below, enlarging in the Y-axis direction is more favorable than reducing in the X-axis direction.

Reducing in the X-axis direction to make the image of an object appear slimmer than the actual object entails a reduction in size of image by using luminous flux with a larger range of field angles in the X-axis direction. In comparison to this, the luminous flux used when enlarging in the Y-axis direction (by keeping the long border direction of the film without change) can be performed using a smaller range of field angles.

Accordingly, since, in general a luminous flux passing through a lens periphery having a large field angle is more susceptible to aberrations than a luminous flux passing through the central part of a lens, better optical imaging results when the identical amount of anamorphism is obtained by enlarging in the Y-axis direction as compared to reducing in the X-axis direction.

In addition, since the portion of the cylindrical lens that requires high precision in order to achieve a small field angle becomes narrow, enlarging in the direction of the short border makes the lens crafting easier while reducing the cost.

Moreover, since the anamorphic attachment lens of the Embodiment 1 consists of a single cylindrical lens, such a lens can easily be combined with a camera's optical system while achieving a high level of compactness. In addition, if this lens is to be manufactured from a plastic material, an inexpensive and light weight attachment lens can be achieved.

Further, since the anamorphic attachment lens that relates to Embodiment 1 has an image-side surface that is similar in shape to the object-side surface of most objective lenses used with popular cameras, and since the attachment lens surfaces in the Y-axis direction have radii of curvature of the same sign (both are positive), the lens achieves superior compactness when arranged in the vicinity a master lens shaped as is master lens $L_2$, as illustrated in FIG. 2.

Table 1 lists, when Embodiment 1 the invention is attached to a master component 1), the surface number # in order from the object side, the radius of curvature $R_x$ (in mm) as measured in the plane defined by the optical axis and the X-axis of each lens element surface, the radius of curvature $R_Y$ (in mm) as measured in the plane defined by the optical axis and the Y-axis, the radius of curvature R (in mm) of each lens element surface of the master component 1, the spacing D (in mm) between each lens element surface as measured along the optical axis, as well as the refractive index $N_d$ and the Abbe constant $v_d$ (at the sodium d-line) for each lens element illustrated in FIGS. 1 and 2. The lower portion of Table 1 lists the $F_{NO.}$ of the master component 1 used with Embodiment 1, the focal distances $f_X$ and $f_Y$ that occur within the plane defined by the optical axis and the X-axis, and the plane defined by the optical axis and the Y-axis, respectively, of the attachment lens of the present invention when attached to the master component 1. The lower portion of the table also lists the value of Yγ, and the ratio of $D/R_{Y1}$ regulated by Conditions (1) and (2), respectively.

TABLE 1

| Lens | $R_X$ | $R_Y$ | D | $N_d$ | $v_d$ |
|---|---|---|---|---|---|
| 1 | ∞ | 10.898 | 2.00 | 1.49023 | 57.5 |
| 2 | ∞ | 10.240 | 3.00 | | |
| | | R | | | |
| 3 | | 4.999 | 1.40 | 1.49023 | 57.5 |
| 4 | | 7.414 | | | |

$F_{NO.} = 10.0$
$f_X = 26.3$
$f_Y = 28.0$
Yγ = 1.0645
$D_1/R_{Y1} = 0.18$

As shown in Table 1, Embodiment 1 satisfies each of Conditions (1) and (2) using a single lens element. The single lens element can thus change the magnification in the Y-axis direction without changing the magnification in the X-axis direction.

Embodiment 2

Figure 3:
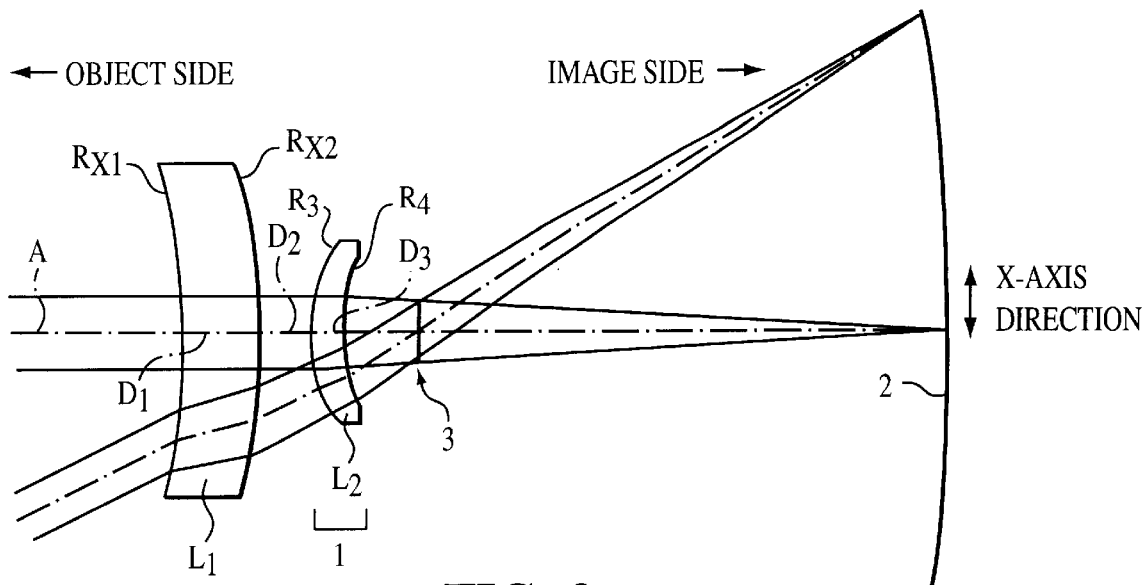
FIG. 3 shows the ray paths that occur in the plane defined by the optical axis A and the X-axis of the anamorphic attachment lens of Embodiment 2.
Figure 4:
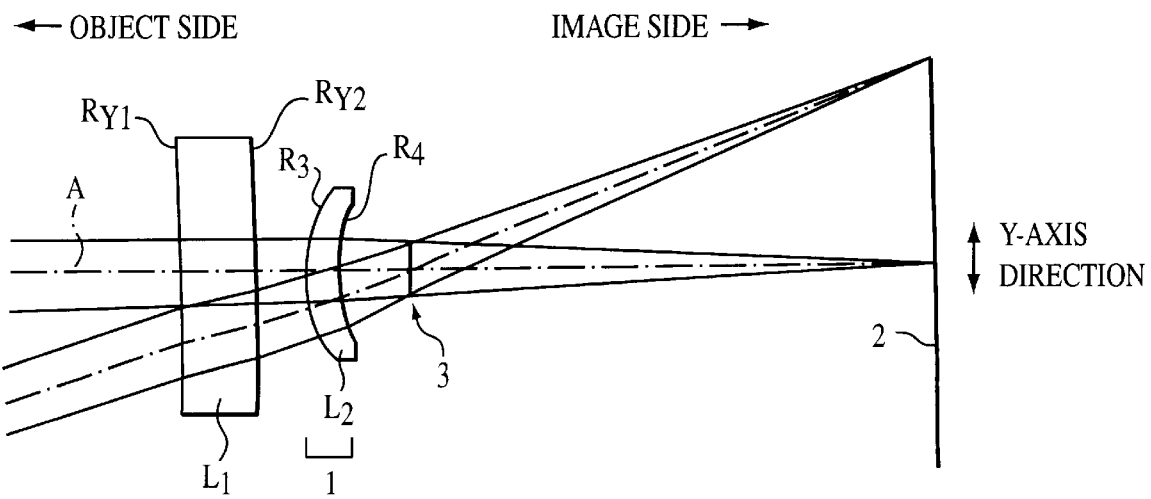
FIG. 4 shows the ray paths that occur in the plane defined by the optical axis A and the Y-axis of the anamorphic attachment lens of Embodiment 2.
Figure 5A:
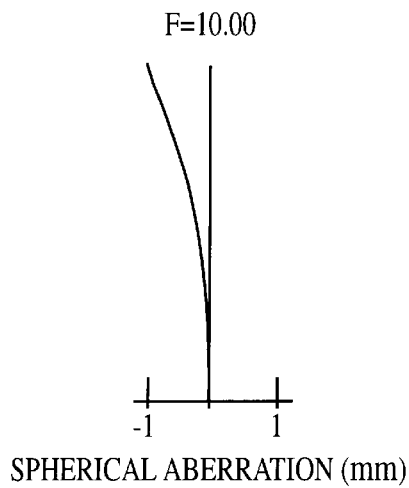
FIGS. 5(a)–5(c) and FIGS. 5(d)–5(f) show, for the X-axis direction and the Y-axis direction, respectively, the spherical aberration, astigmatism (in the sagittal S and tangential T plane) and distortion, respectively, of the anamorphic attachment lens of Embodiment 1.
Figure 5B:
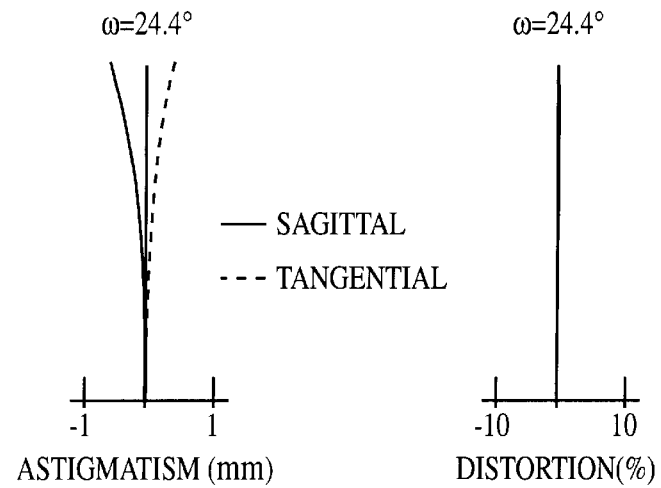
Figure 5C:
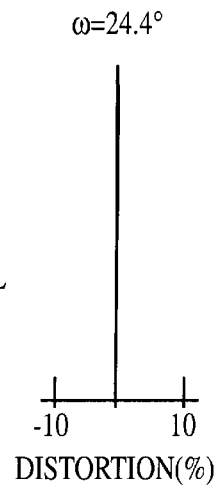
Figure 5D:
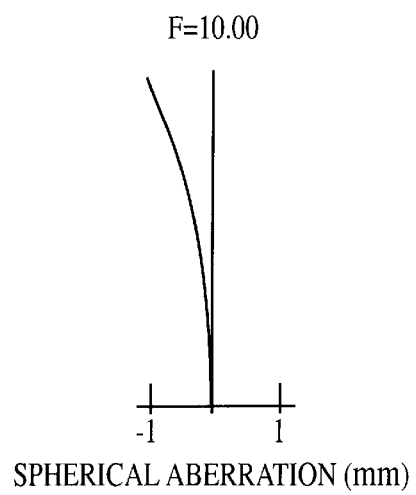
Figure 5E:
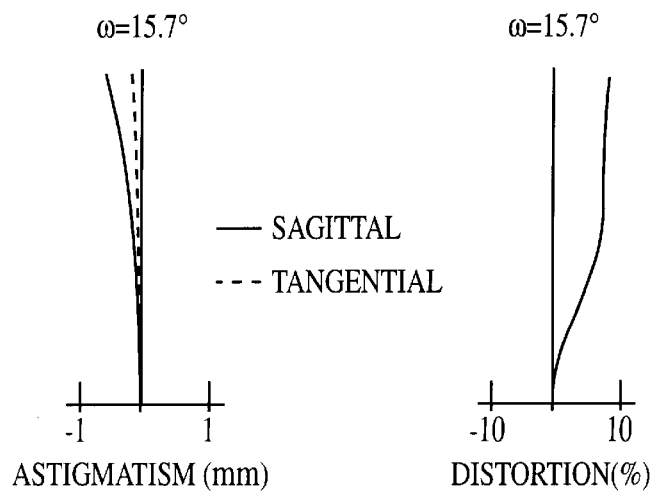
Figure 5F:
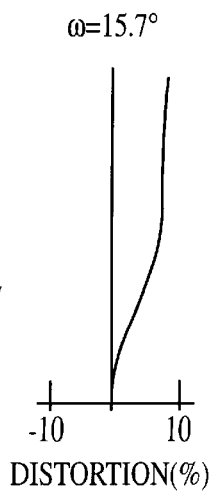
Figure 6A:
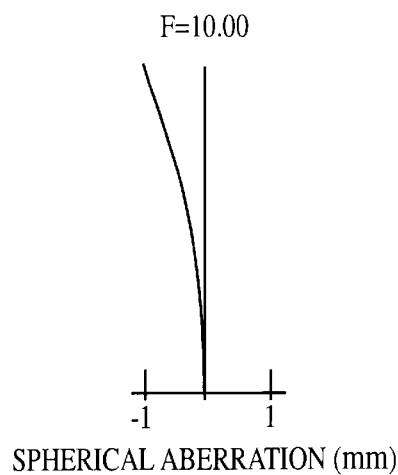
FIGS. 6(a)–6(c) and FIGS. 6(d)–6(f) show, for the X-axis direction and the Y-axis direction, respectively, the spherical aberration, astigmatism (in the sagittal S and tangential T plane) and distortion, respectively, of the anamorphic attachment lens of Embodiment 2.
Figure 6B:
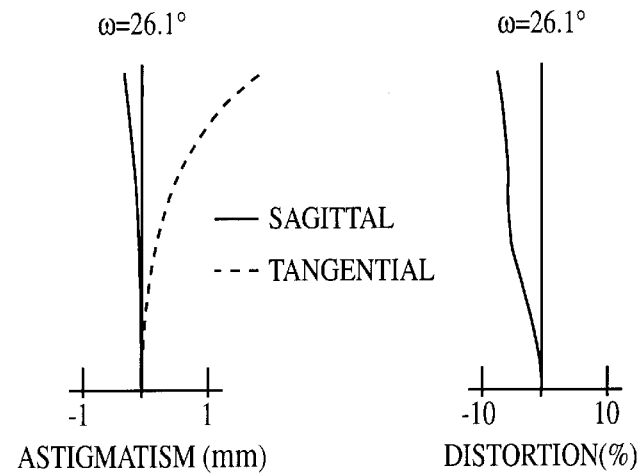
Figure 6C:
Figure 6D:
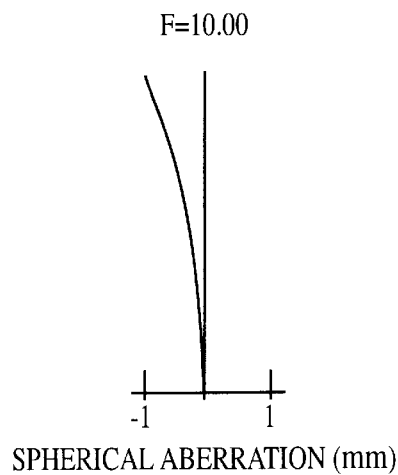
Figure 6E:
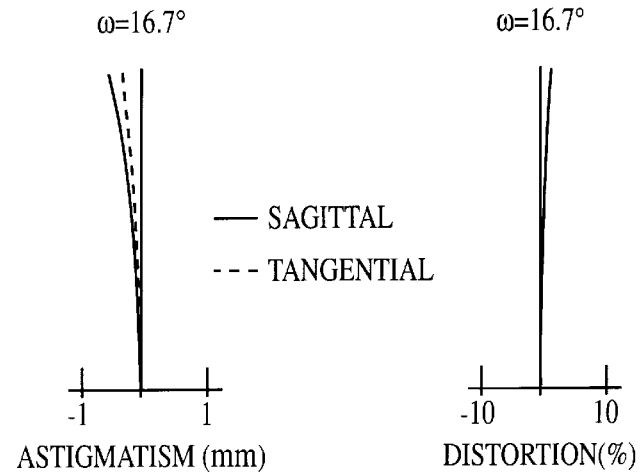
Figure 6F:
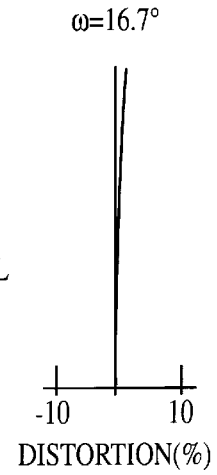

FIG. 3 and FIG. 4 illustrate the lens element components in a plane defined by the optical axis and the X-axis, and the plane defined by the optical axis and the Y-axis, respectively, of the anamorphic attachment lens of Embodiment 2 of the present invention.

As is indicated in FIG. 3 and FIG. 4, the anamorphic attachment lens $L_1$ of Embodiment 2 is arranged on the photographic object side of the master component 1, and is comprised of, in order from the photographic object side: a cylindrical lens surface of concave shape and negative refractive power within a plane defined by the optical axis and the X-axis with the concave surface on the photographic object side, and a cylindrical lens surface having a convex shape and positive refractive power in a plane defined by the optical axis and the X-axis, with the concave surface on the photographic object side.

Table 2 lists, for Embodiment 2 of the present invention when attached to a master component 1, the surface number # in order from the object side, the radius of curvature $R_X$ (in mm) as measured in the plane defined by the optical axis and the X-axis of each lens element surface, the radius of curvature $R_Y$ (in mm) as measured in the plane defined by the optical axis and the Y-axis, the radius of curvature R (in mm) of each lens element surface of the master component 1, the spacing D (in mm) between each lens element surface as measured along the optical axis, as well as the refractive index $N_d$ and the Abbe constant $v_d$ for each lens element (at the sodium d-line) illustrated in FIGS. 3 and 4. The center portion of Table 2 lists the $F_{NO.}$ of the master component 1 used with Embodiment 2, the focal distances $f_X$ and $f_Y$ that occur within the plane defined by the optical axis and the X-axis, and the plane defined by the optical axis and the Y-axis, respectively, of the attachment lens of the present invention when attached to the master component 1. The bottom portion of the table also lists the values of Conditions (3) and (4).

TABLE 2

| # | $R_X$ | $R_Y$ | D | $N_d$ | $v_d$ |
|---|---|---|---|---|---|
| 1* | −19.502 | ∞ | 3.00 | 1.49023 | 57.5 |
| 2 | −20.488 | ∞ | 2.00 | | |
| | | R | | | |
| 3 | | 4.999 | 1.40 | 1.49023 | 57.5 |
| 4 | | 7.414 | | | |

$F_{NO.} = 10.0$
$f_X = 25.0$
$f_Y = 26.3$
Xγ = 0.95
$D_1/R_{X1} = -0.15$

As shown in Table 2, Embodiment 2 satisfies each of Conditions (3) and (4) with a simple composition using a single lens, and it is obvious that it is an anamorphic attachment lens that has the ability for image formation by changing only the magnification in the X-axis direction without changing the magnification in the Y-axis direction.

This surface indicated by a * to the right of the surface number # (i.e., surface #1) in Table 2 is aspherical. The shape of this surface is given by Equation A below.

$$Z=CY^2/\{1+(1-KC^2Y^2)^{1/2}\}+A_4Y^4+A_6Y^6+A_8Y^8+A_{10}Y^{10} \quad \text{(Equation A)}$$

where
  Z is the length (in mm) of a line drawn from a point on the aspherical surface at distance Y from the optical axis to the tangential plane of the aspherical surface vertex,
  C (=1/R) is the curvature of the aspherical surface near the optical axis,
  Y is the distance (in mm) from the optical axis,
  K is the eccentricity, and
  $A_4$, $A_6$, $A_8$, and $A_{10}$ are the 4th, 6th, 8th, and 10th aspherical coefficients.

Table 3 lists the values of each of the coefficients K, $A_4$, $A_6$, $A_8$, and $A_{10}$ of the aspherical surface in Embodiment 2.

TABLE 3

| # | K | $A_4$ | $A_6$ | $A_8$ | $A_{10}$ |
|---|---|---|---|---|---|
| 1 | 1.0 | 2.572265 × $10^{-6}$ | −2.060683 × $10^{-8}$ | −7.560140 × $10^{-11}$ | −1.470483 × $10^{-13}$ |

FIGS. 5(a)–5(c) and FIGS. 5(d)–5(f) show, for the X-axis direction and the Y-axis direction, respectively, the spherical aberration, astigmatism and distortion, respectively, of the anamorphic attachment lens of Embodiment 1. Similarly, FIGS. 6(a)–(c) and FIGS. 6(d)–(f) show, for the X-axis direction and the Y-axis direction, respectively, the spherical aberration, astigmatism and distortion, respectively, of the anamorphic attachment lens of Embodiment 2. As shown in FIGS. 5(a)–5(f) and FIGS. 6(a)–6(f), it is evident that the anamorphic attachment lens of Embodiments 1 and 2 favorably corrects the various aberrations illustrated.

In addition, the anamorphic attachment lens of the present invention can be used by establishing in advance the direction that the magnification of the anamorphic attachment lens changes in relation to the direction of general use of film. That is to say, when the Y-axis direction of the anamorphic attachment lens of Embodiments 1 and 2 is arranged to match the vertical (short border) direction of the film, then it is possible to photograph a standing person so as to appear slimmer than normal. Further, if the optical system in its entirety is rotated 90 degrees about the optical axis (i.e., by rotating the normally horizontal position of the camera to a vertical position) then, it is possible to make the image of the standing person appear fatter than normal.

Furthermore, the anamorphic attachment lens of the present invention can be made so that only it need be rotated 90 degrees about the optical axis. In this way, it is possible to easily select whether the photograph of the object, as well as the view of the object in the finder, will appear longer in the vertical or horizontal directions.

As described above, according to the anamorphic attachment lens that relates to the present invention, it is possible to obtain an anamorphic attachment lens that has the ability to form an image where the magnification in the vertical direction and the horizontal direction are mutually different by changing only one direction of the field angle while maintaining a simple construction with a single cylindrical lens where the code for the curvature radii for both sides are the same and which is afocal. In this manner, it is possible, for example, to photograph a person as a photographic object and have the appearance of being thinner than in actuality, or being fatter than in actuality.

The invention being thus described, it will be obvious that the same may be varied in many ways. Such variations are not to be regarded as a departure from the spirit and scope of the invention. For example, the curvature radius R of each lens element and the surface spacings D may be varied as appropriate. Further, the attachment lens of the present invention is not restricted to the combination of there being a master lens or film, as illustrated above. In addition, when used in combination with a master lens and/or film, the master lens and film need not have the same orientation, or vertical and horizontal magnifications as in the embodiments described above. Rather the scope of the invention shall be defined as set forth in the following claims and their legal equivalents. All such modifications as would be obvious to one skilled in the art are intended to be included within the scope of the following claims.

What is claimed is:

1. An anamorphic attachment lens consisting of a single lens element that has refractive power in a first direction and does not have refractive power in a second direction that is normal to said first direction, said anamorphic attachment lens including a cylindrical first surface of convex shape on the photographic object side so as to have refractive power in one direction; and a cylindrical second surface of concave shape on the photographic object side, said cylindrical second surface having its axis aligned with the axis of the cylindrical first surface, said anamorphic attachment lens being substantially afocal so as to cause light rays incident on the first surface to exit from the second surface substantially parallel to the incident rays.

2. The anamorphic attachment lens of claim 1, and further comprising said attachment lens satisfying each of the following Conditions (1) and (2)

$$1.0 < Y\gamma < 1.1 \qquad (1)$$

$$0.05 < D/R_{Y1} < 0.50 \qquad (2)$$

where, $Y\gamma$ is the angular magnification occurring in the direction that the anamorphic attachment lens has refractive power, D is the on-axis thickness of the anamorphic attachment lens, and $R_{Y1}$ is the radius of curvature of the anamorphic attachment lens surface on the photographic object side in the direction the anamorphic attachment lens has refractive power.

3. The anamorphic attachment lens of claim 1, and further comprising said attachment lens satisfying each of the following Conditions (3) and (4)

$$0.9 < X\gamma < 1.0 \qquad (3)$$

$$-0.2 < D/R_{X1} < -0.03 \qquad (4)$$

where $X\gamma$ is the angular magnification occurring in the direction that the anamorphic attachment lens has refractive power, D is the on-axis thickness of the anamorphic attachment lens, $R_{X1}$ is the radius of curvature in the direction having a refractive power of the surface of the anamorphic attachment lens on the photographic object side.

4. An anamorphic attachment lens consisting of a single lens element that refracts incident rays within a first plane and does not refract incident rays within a second plane that is normal to said first plane, said anamorphic attachment lens including a cylindrical first surface of convex shape on the photographic object side so as to have refractive power in one direction; and a cylindrical second surface of concave shape, said cylindrical second surface having its axis aligned with the axis of the cylindrical first surface, said anamorphic attachment lens being substantially afocal so as to cause light rays incident on the first surface to exit from the second surface substantially parallel to the incident rays.

5. The anamorphic attachment lens of claim 4, and further comprising said attachment lens satisfying each of the following conditions:

$$1.0 < Y\gamma < 1.1$$

$$0.05 < D/R_{Y1} < 0.50$$

where, $Y\gamma$ is the angular magnification occurring in the direction that the anamorphic attachment lens has refractive power, D is the on-axis thickness of the anamorphic attachment lens, and R is the radius of curvature of the anamorphic attachment lens surface on the photographic object side in the direction the anamorphic attachment lens has refractive power.

6. The anamorphic attachment lens of claim 5, in combination with a photographic objective lens.

7. The anamorphic attachment lens of claim 4, in combination with a photographic objective lens.

8. An anamorphic attachment lens consisting of a single lens element that refracts incident rays within a first plane and does not refract incident rays within a second plane that is normal to said first plane, said anamorphic attachment lens including a cylindrical first surface of concave shape on the photographic object side so as to have refractive power in one direction; and a cylindrical second surface of convex shape, said cylindrical second surface having its axis aligned with the axis of the cylindrical first surface, said anamorphic attachment lens being substantially afocal so as to cause light rays incident on the first surface to exit from the second surface substantially parallel to the incident rays.

9. The anamorphic attachment lens of claim 8, and further comprising said anamorphic attachment lens satisfying each of the following conditions:

$$0.9 < X\gamma < 1.0$$

$$-0.2 < D/R_{X1} < 0.03$$

where, $X\gamma$ is the angular magnification occurring in the direction that the anamorphic attachment lens has refractive power, D is the on-axis thickness of the anamorphic attachment lens, $R_{X1}$ is the radius of curvature in the direction having a refractive power of the surface of the anamorphic attachment lens on the photographic object side.

10. The anamorphic attachment lens of claim 9, in combination with a photographic objective lens.

11. The anamorphic attachment lens of claim 8, in combination with a photographic objective lens.

* * * * *

UNITED STATES PATENT AND TRADEMARK OFFICE
CERTIFICATE OF CORRECTION

PATENT NO : 6,072,636
DATED : June 6, 2000
INVENTOR(S): Kenichi SATO

It is certified that error appears in the above-identified patent and that said Letters Patent are hereby corrected as shown below:

At col. 3, line 30: "direction. He" should be
-- direction while --

At col. 4, line 8: "film illustrated" should be
-- film. Illustrated --.

Signed and Sealed this

Third Day of April, 2001

NICHOLAS P. GODICI

*Attesting Officer*   Acting Director of the United States Patent and Trademark Office